No. 769,552. PATENTED SEPT. 6, 1904.
C. W. MANLOVE.
ANIMAL SHEARS.
APPLICATION FILED APR. 21, 1904.

NO MODEL. 2 SHEETS—SHEET 1.

WITNESSES:
F. C. Gibson
John T. Schrott

INVENTOR
Charles W. Manlove
BY
Fred G. Dieterich & Co.
ATTORNEYS

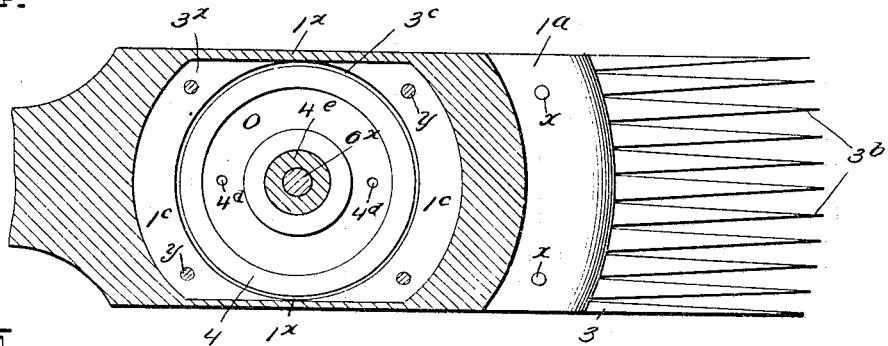
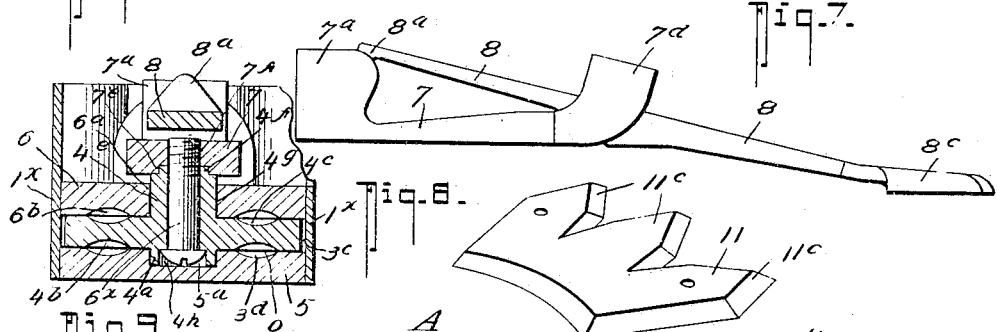
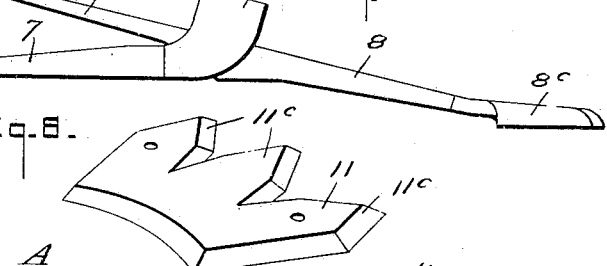
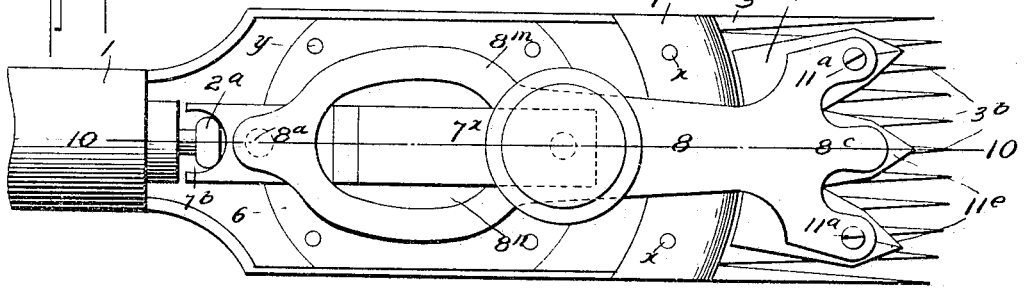
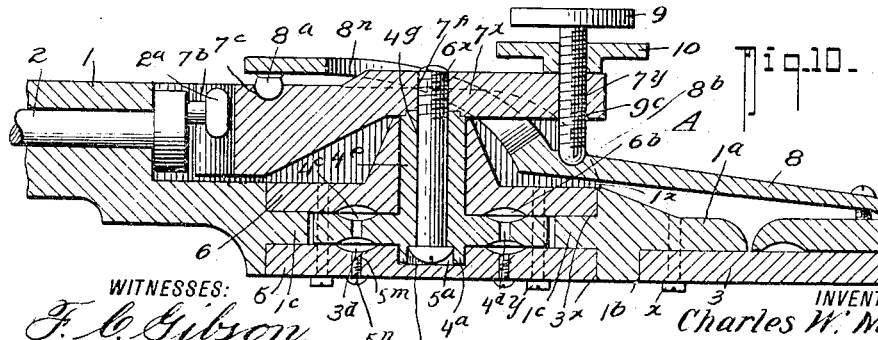

No. 769,552.

Patented September 6, 1904.

UNITED STATES PATENT OFFICE.

CHARLES W. MANLOVE, OF NEW BRIGHTON, MINNESOTA.

ANIMAL-SHEARS.

SPECIFICATION forming part of Letters Patent No. 769,552, dated September 6, 1904.

Application filed April 21, 1904. Serial No. 204,345. (No model.)

*To all whom it may concern:*

Be it known that I, CHARLES W. MANLOVE, residing at New Brighton, in the county of Ramsey and State of Minnesota, have invented certain new and useful Improvements in Animal-Shears, of which the following is a specification.

This invention relates to improvements in portable apparatus for clipping sheep and other animals; and it primarily seeks to provide an apparatus of this character of a simple and efficient construction and which can be easily and readily manipulated to serve its intended purposes.
Generically the invention includes a comb portion carried by a suitable handle and an oscillatory or reciprocal cutter coacting with said comb and driven by suitable motive power through the medium of a rotary shaft and crank connection.

Again, this invention includes an oscillatory wheel which is so arranged as to permit great speed of movement of the oscillatory cutter.

In its more detailed nature the invention consists in certain novel constructions and combination of parts, all of which will be first described in detail and then specifically pointed out in the accompanying drawings, in which—

Figure 1 is a top plan view of my invention.
Fig. 2 is a top plan view thereof. Fig. 3 is a longitudinal section on the line 3 3 of Fig. 1. Fig. 4 is a horizontal section on the line 4 4 of Fig. 3. Fig. 5 is a cross-section on the line 5 5 of Fig. 3. Fig. 6 is a detail perspective view of the oscillatory wheel. Fig. 7 is a similar view of the oscillatory arm, together with its cutter-carrying member. Fig. 8 is a similar view of the cutting member detached. Fig. 9 is a top plan view of a slightly-modified form of my invention. Fig. 10 is a longitudinal section thereof on the line 10 10 of Fig. 9.

Referring now to the accompanying drawings, in which like numerals and letters of reference indicate like parts in all the figures, the shears (designated generally by A) consist of a hollow handle 1, in which is mounted a shaft 2, having a crank $2^a$ at one end and an eye or other suitable device (not shown) at the opposite end for connecting with any suitable drive-shaft. (Not shown.) The handle 1 has side flanges $1^x$ and an extension $1^a$, having a semicircular flange $1^b$, to which the base-plate 3, having a circular end $3^a$, is attached by the screw portions $x$ or otherwise. At the other end the base-plate 3 has a series of comb-fingers $3^b$ arranged with their points in the arc of a circle.

$3^c$ designates a bore in the handle extension $1^a$ to receive a wheel 4, hereinafter referred to. Concentric with and of a greater diameter than the bore $3^c$ are countersunk portions $3^x$ $3^x$ in the handle extension $1^a$ to form a flange $1^c$, as shown. Held within the countersunk portion $3^x$ of the extension $1^a$, with its lower face flush with the lower face of the said extension, is a substantially circular plate 5, having a countersunk portion $5^a$ on its upper face to receive a short hub $4^a$ of the oscillatory wheel 4, and the said plate 5 has a groove $3^d$ concentric with the portion $5^a$, for the purposes presently to appear.

The wheel 4 has a pair of concentric grooves $4^b$ $4^c$ of equal radii, one on each face thereof, and the said grooves $4^b$ $4^c$ are of the same radius as the groove $3^d$, so that the said grooves $4^b$ $4^c$ $3^d$ are in the same vertical alinement. The wheel 4 has a plurality of transverse apertures $4^d$, communicating with the grooves $4^b$ $4^c$, and the said wheel also has an extending hub $4^e$, having a squared portion $4^f$ at its upper end, and the said hub has an elongated bore $4^g$, merging with a countersunk portion $4^h$ to receive the securing-bolt $6^x$ for a purpose presently explained. Fitted over the wheel 4 is a circular plate 6, having a concentric bore $6^a$ to receive a hub $4^e$ and a circular groove $6^b$, corresponding with the grooves $4^b$ $4^c$ $3^d$, which grooves together form oil-receiving chambers, the plate 5 having oil-admitting apertures $3^m$, normally closed by the plugs $3^n$, as shown. The plate 5 and the plate 6 are securely fastened to the flange $1^c$ by the bolts $y$, as shown.

7 designates a vibrating arm, including a hub $7^a$, having a semicircular groove $7^b$ to receive the crank $2^a$ of the shaft 2, and the said hub $7^a$ also has a socket $7^c$ to receive the ball connection $8^a$ of the cutter-carrier member 8. The arm 7 also includes a bridge $7^d$, apertured to receive the screw 9, upon which is mounted a check-nut 10, and the said screw 9 has a head $9^a$ and at its lower end terminates in the ball $9^b$, adapted to seat in the socket $8^b$ of the cutter-carrier 8, which carrier 8 passes under the bridge portion $7^d$ and terminates at its forward end in a fork $8^c$, to which the cutter 11 is joined by the screws $11^a$, which pass through apertures $8^x$ in the carrier 8. In practice the cutter 11 consists of three cutter-fingers $11^c$, and the comb consists of ten teeth $3^b$, as shown. The arm 7 has a squared countersunk portion $7^e$ and threaded bore $7^f$ to seat on the squared end $4^f$ of the hub $4^a$ of the wheel 4 and to receive the securing-bolt $6^x$, respectively. So far as described it will be seen that when rotary motion is imparted to the shaft 2 it will cause the arm 7 to vibrate, thereby imparting a vibratory motion to the wheel 4, the cutter-carrying member, and the cutter 11.

By providing the wheel 4 and by arranging the cutter-carrying member, the cutter, and the vibrating arm coöperating with the crank-arm of the shaft in the manner shown a greater speed of operation can be obtained, the parts moving in the arcs of circles. By constructing the cutter-carrier member and arranging it with respect to the vibrating arm, as shown, I insure a more even movement of the cutter and insure its positive contact with the base-plate, and thereby permit the cutter to adapt itself to any unevenness in the surface of contact of the base-plate. By filling the chamber O with oil through the oil-apertures in the plate 5 the wheel 4 wherever it is in movable contact with other parts will always be well lubricated. The desired tension or pressure may be given to the cutter member by simply adjusting the screw 9 in the bridge portion of the vibratory arm. It should be understood that in practice the upper and lower surfaces of the cutter and the upper surface of the base-plate where the cutter engages are ground to form a perfect fit, as is also the forked end of the cutter-carrier member.

In Figs. 9 and 10 I have shown a slightly-modified form of my invention in which the arm 7 is of slightly-different form than in the form of my invention shown in Fig. 1, and in this form the hub $4^e$ is longer than in Fig. 1, and the arm 7 is made substantially rectangular in plan view with the socket $7^c$ in a plane below the end $7^x$ of the handle opposite the hub $7^a$, and the said end $7^x$ also has a threaded aperture $7^y$ to receive the adjusting-screw 9, and in this form the cross portion is eliminated.

In the form shown in Figs. 9 and 10 the cutter-carrier 8 is formed with an enlargement $8^m$, having a bore $8^n$ to permit the end $7^x$ of the arm 7 to pass therethrough, and the said cutter-carrier 8 in this form has its socket so arranged as to be in alinement with the adjusting-screw $9^c$.

From the foregoing it will be seen that I have provided a simple, durable, and easily-operated shears which will readily serve its intended purposes, and from the foregoing description, taken in connection with the accompanying drawings, it is thought the complete operation, construction, and advantages of my invention will be readily understood by those skilled in the art to which it appertains.

I desire it understood that slight changes in the detailed arrangement and construction of parts may be made without departing from the scope of the invention or the appended claims.

I am aware that animal-shears have heretofore been provided in which a vibratory motion is given to a cutter through the medium of a rotary shaft and crank connection, and I do not claim such construction broadly; but What I do claim, and desire to secure by Letters Patent, is—

1. In a device of the character stated, a hollow handle having an extension, a base-plate having comb-teeth secured to said extension, a cutter movable over said teeth, a wheel having a hub mounted in said handle extension, a vibratory arm mounted on said wheel, cutter-carrying members mounted on said vibratory arm, and having a ball-and-socket connection therewith, a shaft having a crank mounted in said handle, said shaft-crank engaging said vibratory arm to impart a vibratory motion thereto and to the wheel, for the purposes specified.

2. In an animal-shearing device, a hollow handle having an extension, a comb-plate secured thereto, said handle extension having a circular bore, a wheel pivotally mounted in said circular bore of the handle extension, said wheel having a hub, an arm having a bridge portion and a socketed head secured to said hub, a rotary shaft mounted in said handle and having a crank member for engaging said arm-head, a cutter-carrier having a ball end to seat in said arm-head socket and adapted to pass under said arm-bridge portion, a cutter movable on said comb-plate over the comb portions thereof and joined with said cutter-carrier, and means for adjusting said cutter-carrier and cutter with respect to the comb-plate, for the purposes specified.

3. In an animal-shearing device, a hollow handle having an extension, a comb-plate having comb portions secured to said extension, said handle having a circular bore and countersunk portions, a plate secured in one of said countersunk portions, a second plate secured in the other countersunk portion, a wheel pivotally mounted between said plates secured in said countersunk portions, said wheel having a hub projecting through an aperture in the second plate, an arm having a socketed head secured to said wheel-hub, a rotary shaft mounted in said handle and having a crank for engaging said arm-head, a cutter-carrier having a ball end to seat in said arm-head socket, a cutter movable on said comb-plate over said comb portion, and joined with said cutter-carrier, said arm and said cutter-carrier having means for adjusting said cutter-carrier and cutter with respect to the comb-plate, for the purposes specified.

4. In an animal-shearing device, a hollow handle having an extension, a comb-plate having comb portions secured to said extension at the end thereof, said handle extension having a circular bore and countersunk portions, a closure-plate for said circular bore held in one of said countersunk portions, a wheel pivotally mounted in said circular bore of the handle extension, said wheel having a hub, a second closure-plate held in the other countersunk portion of the handle extension and having an aperture to receive the wheel-hub, an arm having a bridge portion and a socketed head secured to said hub, a rotary shaft mounted in said handle and having a crank member for engaging said arm-head, a cutter-carrier having a ball end to seat in said arm-head and adapted to pass under said bridge portion, a cutter movable on said comb-plate over the comb portion thereof and joined with said cutter-carrier, means for adjusting said cutter-carrier and cutter with respect to the comb-plate, said wheel having concentric grooves on its face to form oil-chambers, for the purposes specified.

5. In an animal-shearing device, a hollow handle having an extension, a comb-plate having comb portions secured to said extension at the end thereof, said handle extension having a circular bore and countersunk portions, a closure-plate for said circular bore held in one of said countersunk portions, a wheel pivotally mounted in said circular bore of the handle extension, said wheel having a hub, a second closure-plate held in the other countersunk portion of the handle extension and having an aperture to receive the wheel-hub, an arm having a bridge portion and a socketed head secured to said hub, a rotary shaft mounted in said handle and having a crank member for engaging said arm-head, a cutter-carrier having a ball end to seat in said arm-head and adapted to pass under said bridge portion, a cutter movable on said comb-plate over the comb portion thereof and joined with said cutter-carrier, means for adjusting said cutter-carrier and cutter with respect to the comb-plate, said wheel having concentric grooves on its face to form oil-chambers, said wheel and said closure-plates each having alining concentric grooves forming oil-chambers, and means for admitting oil to said chambers, for the purposes specified.

6. A hollow handle having an extension, a rotary shaft having a crank mounted in said hollow handle, a comb-plate having a comb end secured to said handle extension, said handle extension having a circular bore and concentric countersunk portions, a closure-plate mounted in one of said countersunk portions, said closure-plate having a countersunk portion, a second closure-plate held in the other countersunk portion of the handle extension, a wheel having a short and long apertured hub mounted between said closure-plates in said circular bore of the handle extension with its short hub in the countersunk portion of the first closure-plate, said second plate having an aperture, said long hub of said wheel passing through said aperture of the second plate and having a squared portion, said short hub having a countersunk portion, an arm including a bridge portion and a head secured to said squared portion of the long hub, a screw passing through said hub-aperture and countersunk portion for securing said arm to said hub, said arm being coöperatively joined with said crank, and a cutter-carrier having a ball-and-socket connection with said arm, a cutter movable in contact with the comb-plate and coöperatively joined with the cutter-carrier, said cutter-carrier having a socket, a screw having a head and a ball end passing through said bridge portion with its ball end in said cutter-carrier socket, and a jam-nut mounted on said screw.

7. A hollow handle having an extension, a rotary shaft having a crank mounted in said hollow handle, a comb-plate having a comb end secured to said handle extension, said handle extension having a circular bore and concentric countersunk portions, a closure-plate mounted in one of said countersunk portions, said closure-plate having a countersunk portion, a second closure-plate held in the other countersunk portion of the handle extension, a wheel having a short and long apertured hub mounted between said closure-plates in said circular bore of the handle extension with its short hub in the countersunk portion of the first closure-plate, said second plate having an aperture, said long hub of said wheel passing through said aperture of the second plate and having a squared portion, said short hub having a countersunk portion, an arm including a bridge portion and a head secured to said squared portion of the long hub, a screw passing through said hub-aperture and countersunk portion for securing said arm to said hub, said arm being coöperatively joined with said crank, and a cutter-carrier having a ball-and-socket connection with said arm, a cutter movable in contact with the comb-plate and coöperatively joined with the cutter-carrier, said cutter-carrier having a socket, a screw having a head and a ball end passing through said bridge portion with its ball end in said cutter-carrier socket, and a jam-nut mounted on said screw, each of said closure-plates and said wheel having alining communicating and circular grooves forming oil-chambers, for the purposes specified.

8. In an instrument of the character stated, a handle, said handle having an extension and side flanges, said extension having a flange at its extreme end, a comb-plate having comb-teeth secured to said handle-extension flange and with its under face in the same plane as the end face of the extension, said handle extension having a bore, and concentric countersunk portions in its lower and upper faces, a circular closure-plate held in said countersunk portion of the lower face with its lower face flush with the lower face of the extension, said closure-plate having a circular groove in its upper face, and transverse bores communicating with said circular grooves, a wheel loosely held in the circular bore of the handle extension, said wheel having a hub, a second closure-plate having an aperture, held over said wheel with the hub in said closure-plate aperture, said second closure-plate being held in the countersunk portion of the upper face of the handle extension, means for securing said closure-plates to said handle extension, said upper closure-plate having a circular groove in its lower face, said wheel having transverse apertures for communicating with the circular grooves of the closure-plates, an arm secured to said wheel-hub and having a head portion, a rotary shaft having a crank for engaging said head portion, a cutter-carrier mounted on said arm and having a ball-and-socket connection therewith, a cutter secured to said cutter-carrier and movable over said comb-plate, for the purposes specified.

CHARLES W. MANLOVE.

Witnesses:
WESLEY WELSHOUSE,
HAROLD WELSHOUSE.